(12) United States Patent
Luei et al.

(10) Patent No.: US 9,159,206 B2
(45) Date of Patent: Oct. 13, 2015

(54) METHOD AND APPARATUS FOR LOCATING A PERSON DURING A MAN-DOWN SITUATION

(71) Applicant: MOTOROLA SOLUTIONS, INC., Schaumburg, IL (US)

(72) Inventors: Fong Min Luei, Penang (MY); Dennis Keat Jeen Lim, Penang (MY); Intan Mazlina Mohd Mohdi, Bayan Lepas (MY); Syed Isa Syed Idrus, Penang (MY); Ting Fook Tang, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 328 days.

(21) Appl. No.: 13/905,877

(22) Filed: May 30, 2013

(65) Prior Publication Data

US 2014/0354423 A1 Dec. 4, 2014

(51) Int. Cl.
*B60Q 1/26* (2006.01)
*G08B 5/00* (2006.01)
*B60Q 1/24* (2006.01)
*G08B 25/01* (2006.01)

(52) U.S. Cl.
CPC ........ *G08B 5/002* (2013.01); *B60Q 1/24* (2013.01); *G08B 25/016* (2013.01)

(58) Field of Classification Search
USPC .......................................................... 340/471
See application file for complete search history.

(56) References Cited

U.S. PATENT DOCUMENTS

| | | | |
|---|---|---|---|
| 5,045,839 A | 9/1991 | Ellis et al. | |
| 5,299,971 A * | 4/1994 | Hart | 446/484 |
| 5,504,477 A * | 4/1996 | Whitright et al. | 340/10.4 |
| 6,081,191 A | 6/2000 | Green et al. | |
| 6,509,830 B1 * | 1/2003 | Elliott | 340/286.02 |
| 7,558,558 B2 | 7/2009 | Langsenakamp et al. | |
| 7,561,036 B2 | 7/2009 | Pederson | |
| 7,825,790 B2 | 11/2010 | Tallinger | |
| 7,940,166 B2 | 5/2011 | Koliopoulos | |
| 8,054,179 B2 * | 11/2011 | Mayhew | 340/539.13 |
| 8,325,029 B2 | 12/2012 | Brooking et al. | |
| 8,786,422 B2 * | 7/2014 | Wang | 340/471 |
| 8,963,705 B2 * | 2/2015 | Miller et al. | 340/471 |
| 2006/0273894 A1 | 12/2006 | Goehler | |
| 2007/0030144 A1 | 2/2007 | Titus et al. | |
| 2008/0218328 A1 * | 9/2008 | Chiu | 340/468 |
| 2009/0018875 A1 | 1/2009 | Montatesti et al. | |
| 2009/0295560 A1 * | 12/2009 | Koliopoulos | 340/471 |
| 2010/0194556 A1 | 8/2010 | Larosa | |
| 2011/0237217 A1 * | 9/2011 | Monks et al. | 455/404.1 |
| 2012/0056757 A1 | 3/2012 | Caudill | |
| 2012/0194334 A1 | 8/2012 | Worthington et al. | |
| 2012/0194352 A1 | 8/2012 | Ellis et al. | |
| 2012/0214507 A1 | 8/2012 | Vartanian et al. | |

FOREIGN PATENT DOCUMENTS

| | | |
|---|---|---|
| EP | 2482264 A2 | 8/2012 |
| WO | 2009129232 A1 | 10/2009 |
| WO | 2010102176 A1 | 9/2010 |

* cited by examiner

*Primary Examiner* — Brian Zimmerman
*Assistant Examiner* — Thomas McCormack
(74) *Attorney, Agent, or Firm* — Kenneth A. Haas

(57) ABSTRACT

A method and apparatus for more-quickly locating an individual during a man-down situation is provided herein. During operation a light source on an officer's vehicle will be directed towards the downed officer when a man-down situation has been identified. Since a light source will be pointed at the downed individual, respondents responding to the man-down situation may more-quickly locate any downed individual.

10 Claims, 3 Drawing Sheets

METHOD AND APPARATUS FOR LOCATING A PERSON DURING A MAN-DOWN SITUATION

FIELD OF THE INVENTION

The present invention generally relates to locating a public-safety officer, and more particularly to a method and apparatus for locating a public-safety officer during a man-down situation.

BACKGROUND OF THE INVENTION

Many public safety officers are equipped with devices that aide in locating the officer during a "man down" situation. For example, a police officer may press an emergency button on a radio that helps identify and locate the officer during a man down situation. Similarly, a fire fighter may wear a Personal Alert Safety System (PASS) device that detects a lack of movement and sounds an audible alarm when movement ceases. Other man-down notification systems sense when an individual has switched from vertical to horizontal orientation and sends an alarm signal back to a dispatch station.

Existing man down notifications have limited effectiveness. For example, people standing 100 feet away from an alarm might not notice a man down audible alert, delaying assistance to the downed individual. Therefore a need exists for a method and apparatus to more-quickly locate a person during a man-down situation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for more-quickly locating an individual during a man-down situation is provided herein. During operation a light source on an officer's vehicle will be directed towards the downed officer when a man-down situation has been identified. Since a light source will be pointed at the downed individual, respondents responding to the man-down situation may more-quickly locate any downed individual.

Figure 1:
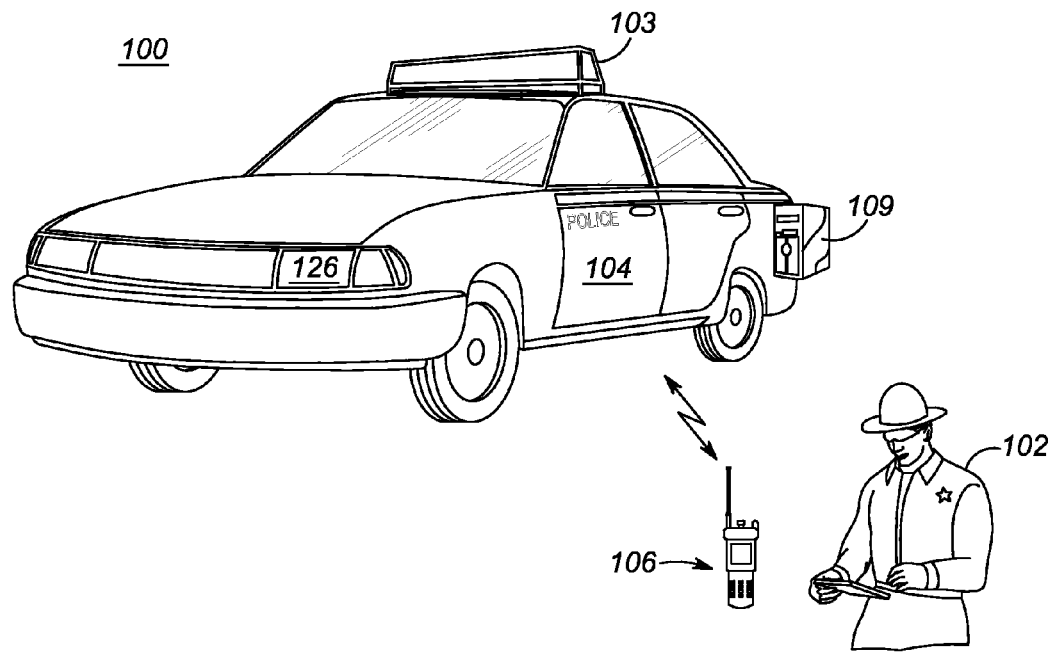
FIG. 1 is block diagram illustrating a general operational environment, according to one embodiment of the present invention.

Turning now to the drawings wherein like numerals represent like elements, FIG. 1 illustrates a general operational environment, according to one embodiment of the present invention. As shown, police officer 102 is outside a public-safety vehicle (e.g., a police car) 104 and carrying wireless radio 106. Radio 106 is equipped with location-finding equipment capable of locating the precise location of radio 106.

Police car 104 is equipped with light bar 103 that contains multiple light sources. In one embodiment one or more of the light sources contained within light bar 103 are mounted upon a guidable/remotely positionable mount. Police car 104 is also equipped with computer 109 that serves to control light bar 103, headlights 126, and/or other vehicle peripheral equipment. Computer 109 is capable of determining its own location and also receiving the location of radio 106. Computer 109 is usually housed in the trunk of the vehicle 104.

During operation, computer 109 will receive a location of radio 106 and determine its own location. When a man-down situation has been detected by computer 109, computer 109 will use its location and the location of radio 106 to determine an appropriate direction to point light bar 103. In particular, at least one light on light-bar 103 will be pointed in the direction of radio 106 in order to aide in locating the police officer 102.

Figure 2:
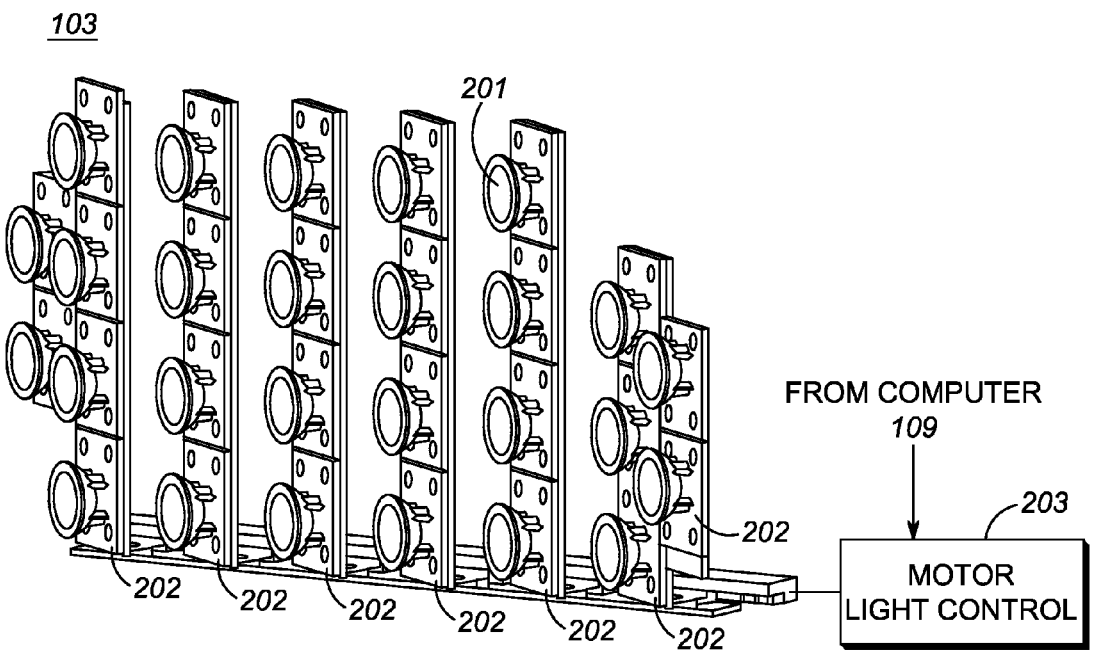
FIG. 2 is a more-detailed illustration of the light bar of FIG. 1.

FIG. 2 is a more-detailed illustration only a portion of the light bar of FIG. 1. Light bar 103 comprises positionable segments 202, containing LED lights 201. As shown LED lights 201 are mounted and grouped into vertical or horizontal segments, arrays or louvers 202, each segment being positionable via instructions from motor 203. Each segment 202 can be moved in X, Y or Z directions or angles-to create a change in light direction, angle, pattern or other property. Alternatively, the beam shape and pattern can be changed without using moving parts by selecting a group or array of lights 201, where each group or array has a different focal length or other property relative to other arrays or groups.

During operation, motor/light control 203 will receive instructions from computer 109 to direct segments 202 to point lights 201 in a direction of radio 106. Motor 203 may also receive instructions as to the distance to radio 106 so that lights 201 can be "focused" on radio 106. In response, motor 203 will direct and focus lights 201 accordingly.

Figure 3:
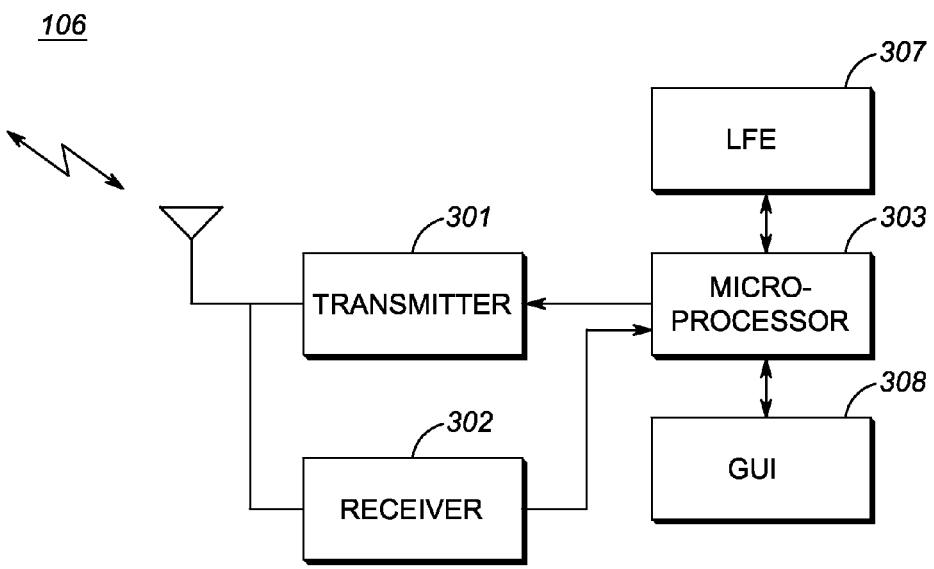
FIG. 3 is a block diagram of the radio of FIG. 1.

FIG. 3 is a block diagram of the radio of FIG. 1. Radio 106 comprises processor 303 that is communicatively coupled with various system components, including transmitter 301, receiver 302, and location-finding equipment (LFE) 307. Only a limited number of system elements are shown for ease of illustration.

Processing device 303 may be partially implemented in hardware and, thereby, programmed with software or firmware logic or code; and/or the processing device 303 may be completely implemented in hardware, for example, as a state machine or ASIC (application specific integrated circuit).

LFE 307 preferably comprises a GPS receiver, however in alternate embodiments circuitry 207 may comprise any device capable of generating information used to determine a current location. For example, LFE 307 may comprise a GPS receiver along with a level sensor, and compass. Regardless of the makeup of LFE 307, logic circuitry 303 will use information generated by LFE 307 to determine the radio's location.

Transmitter 301 and receiver 302 are common circuitry known in the art for communication utilizing a well known communication protocol, and serve as means for transmitting and receiving messages, including a location and a notification of a man-down situation. For example, receiver 302 and transmitter 301 are well known wireless receivers and transmitters that utilize the IEEE 802.11 communication system protocol. Other possible transmitters and receivers include, but are not limited to transceivers utilizing Bluetooth, HyperLAN protocols, or any other communication system protocol.

Radio 106 is also equipped with graphical user interface 308. In order to provide the above features (and additional features), GUI 308 may include a monitor, a keyboard, a button, and/or various other hardware components to provide a man/machine interface capable of receiving an indication of a man-down situation.

During operation, processor 303 receives a man-down notification. This notification may come from GUI 308, for example, as an officer pushes a special "man down" button on his radio. Alternatively, the man-down notification may come from other sensors (not shown) that detect various contexts for radio 106. For example, if a PASS system is being utilized, the PASS system may provide a signal to microprocessor 303 that a man-down situation has occurred.

Regardless of how microprocessor 303 receives a man-down notification, processor 303 will access LFE 307 to determine a current location. The current location along with a man-down notification will be sent to transmitter 301 and transmitted to computer 109.

Figure 4:
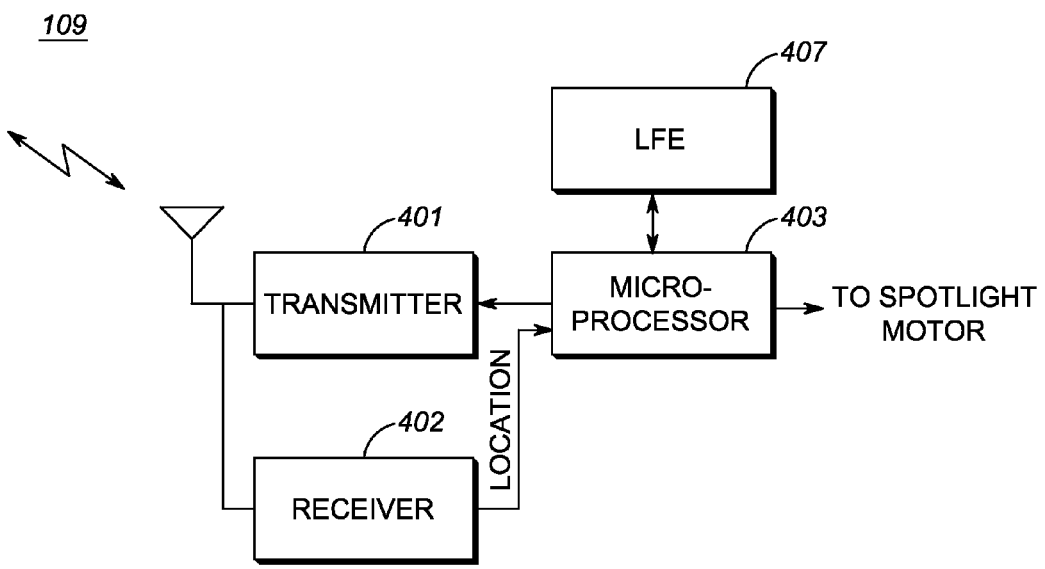
FIG. 4 is a block diagram of the computer of FIG. 1.

FIG. 4 is a block diagram of the computer of FIG. 1. As shown, computer 109 comprises processor 403 that is communicatively coupled with various system components, including transmitter 401, receiver 402, and location finding equipment (LFE) 407. All components in FIG. 4 are similar to the corresponding components described above with reference to FIG. 3.

Figure 5:
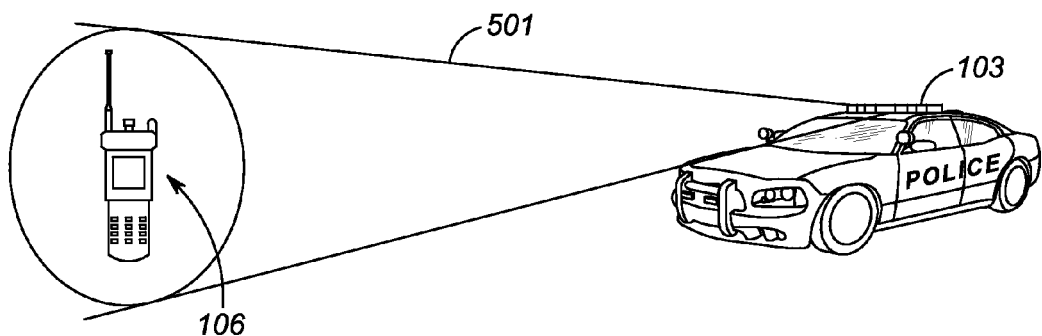
FIG. 5 shows the light bar of FIG. 1 directing a beam of light in the direction of the radio of FIG. 1.

During operation receiver 402 will receive a notification of a man down situation from radio 106, along with the radio's location. In response, processor 403 will determine its own location and orientation. In particular, LFE 407 may comprise a GPS receiver, a compass, and a level. Using LFE 407 processor 403 will then determine the location of light bar 103 and its orientation and level. For example, along with the geographic location of light bar 103, processor 403 will determine a compass direction (e.g., pointing 125 degrees from North) and a level (pointing 4 degrees above horizontal). This information will then be used to calculate a direction for pointing a spot light in the location of radio 106. In other words, the location of radio 106 and the location of light bar 103 are both utilized to determine a direction to aim light bar 103 so that radio 106 is illuminated. This is illustrated in FIG. 5 where light bar 103 directs a beam of light 501 in the direction of radio 106.

Figure 6:
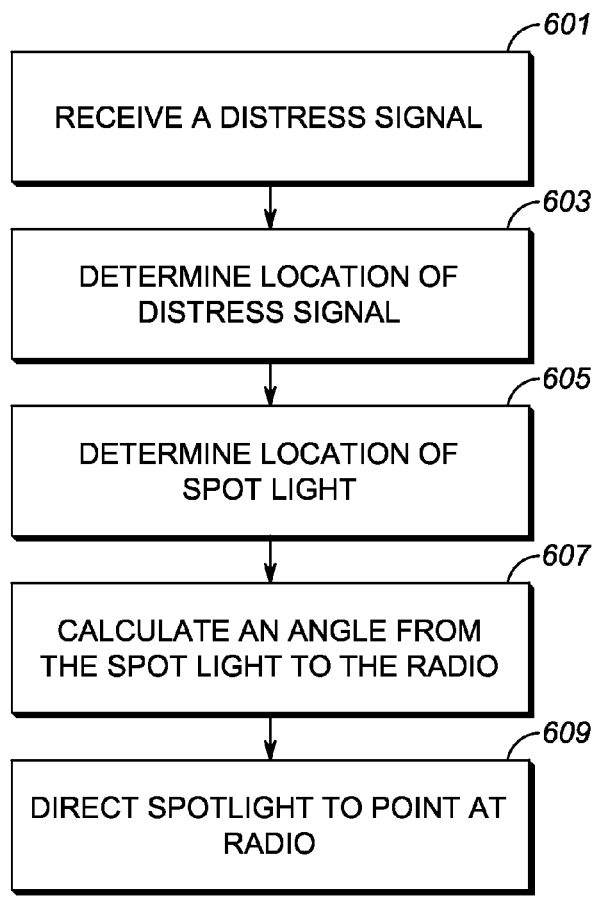
FIG. 6 is a flow chart showing operation of the computer of FIG. 1.

FIG. 6 is a flow chart showing operation of the computer of FIG. 4. In particular, the logic flow of FIG. 6 describes a method for locating a person. The logic flow begins at step 601 where logic circuitry 403 receives a distress notification and determines a location of the distress notification (step 603). As discussed above, the distress notification may comprise a man-down notification and the location of the distress notification may simply comprise a geographic location of radio 106 (e.g., a latitude and a longitude of the radio). The location of radio 106 may be determined by receiver 402 wirelessly receiving a message containing the location of the distress notification.

A location of a spotlight is then determined by logic circuitry 403 at step 605. This step may simply comprise determining the location of a light bar existing on top of an emergency response vehicle. At step 607 logic circuitry calculates an angle from the spotlight to the location of the distress notification. More particularly, at step 607 logic circuitry determines the orientation and location of the spotlight and calculates how to point the spotlight in order to illuminate the radio. Specifically, since the location and orientation of the spotlight is know, a direction to radio 106 is calculated and an appropriate direction to aim the spotlight is then determined. Finally, at step 609 logic circuitry directs spotlight motor/controller 203 to the spotlight to the location of the distress notification to aide in locating the person.

In the foregoing specification, specific embodiments have been described. However, one of ordinary skill in the art appreciates that various modifications and changes can be made without departing from the scope of the invention as set forth in the claims below. For example, while the above-described technique directed a light bar towards a downed officer, one of ordinary skill in the art will recognize that any light source attached to vehicle 104 may be directed towards the officer. For example, U.S. Pat. No. 8,274,226 "SYSTEM AND METHOD OF INTEGRATING AN LED SPOTLIGHT" describes many light sources that may be placed on vehicle 104, all of which may be controlled as described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for locating a person, the method comprising the steps of:
   receiving a distress notification;
   determining a location of the distress notification;
   determining a location of a spotlight;
   calculating an angle from the spotlight to the location of the distress notification;
   pointing the spotlight to the location of the distress notification to aide in locating the person; and
   wherein the step of determining the location of the spotlight comprises the step of determining a location of an emergency response vehicle's spotlight.

2. The method of claim 1 wherein the distress notification comprises a man-down notification.

3. The method of claim 1 wherein the step of determining the location of the distress notification comprises the step of wirelessly receiving a message containing the location of the distress notification.

4. The method of claim 1 wherein the step of determining the location of the spotlight comprises the step of determining a location of a light bar on top of an emergency response vehicle.

5. A method for locating a person, the method comprising the steps of:
   receiving a man-down notification from a wireless radio;
   receiving a location of the wireless radio;
   determining a location of an emergency response vehicle;
   determining an angle to direct a spotlight based on the location of the emergency response vehicle and the location of the wireless radio; and
   pointing a spotlight attached to the vehicle to the location of the wireless radio to aide in locating the person.

6. The method of claim 5 wherein the location of the wireless radio comprises a geographic location of the wireless radio.

7. The method of claim 5 wherein the emergency response vehicle comprises a police car.

8. The method of claim 5 wherein the spotlight comprises a public safety vehicle light bar.

9. An apparatus comprising:
   a wireless receiver receiving a distress notification;
   logic circuitry determining a location of the distress notification, determining a location of an emergency vehicle's spotlight, and calculating an angle from the spotlight to the location of the distress notification; and
   a motor receiving instructions from the logic circuitry to point the spotlight to the location of the distress notification to aide in locating a person.

10. The apparatus of claim 9 wherein the distress notification comprises a man-down notification.

* * * * *

UNITED STATES PATENT AND TRADEMARK OFFICE
CERTIFICATE OF CORRECTION

| | | |
|---|---|---|
| PATENT NO. | : 9,159,206 B2 | Page 1 of 1 |
| APPLICATION NO. | : 13/905877 | |
| DATED | : October 13, 2015 | |
| INVENTOR(S) | : Luei et al. | |

It is certified that error appears in the above-identified patent and that said Letters Patent is hereby corrected as shown below:

IN THE SPECIFICATION:

Column 1, Line 38, delete "is block" and insert -- is a block --, therefor.

Column 4, Line 6, delete "is know," and insert -- is known, --, therefor.

Signed and Sealed this
Twenty-first Day of June, 2016

Michelle K. Lee
*Director of the United States Patent and Trademark Office*